Oct. 9, 1951  J. CASSADY  2,570,319
LOW HEIGHT TRACTOR FOR HAULING MINE CARS
Filed Dec. 9, 1948  4 Sheets-Sheet 1

Inventor

Joe Cassady

By *Clarence A. O'Brien
and Harvey B. Jacobson*
Attorneys

Oct. 9, 1951    J. CASSADY    2,570,319
LOW HEIGHT TRACTOR FOR HAULING MINE CARS
Filed Dec. 9, 1948    4 Sheets-Sheet 2
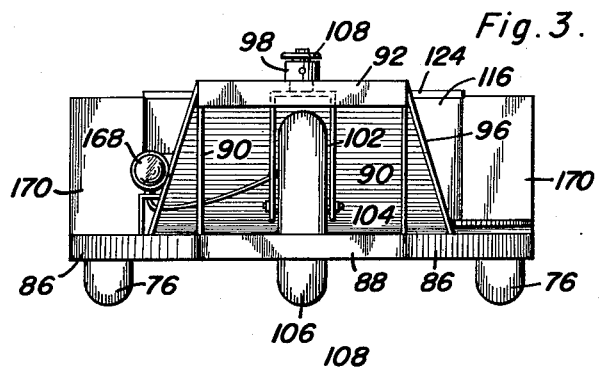
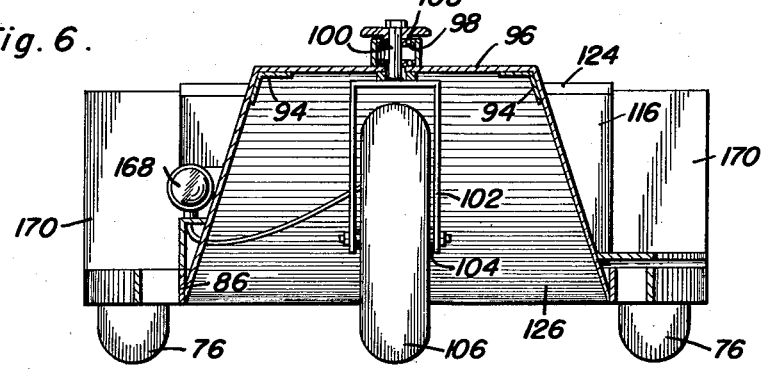
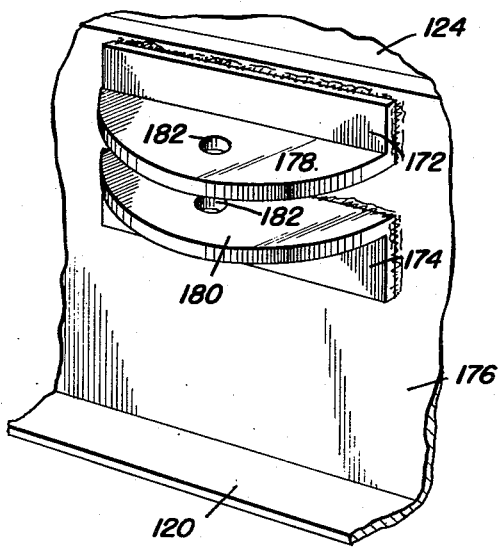
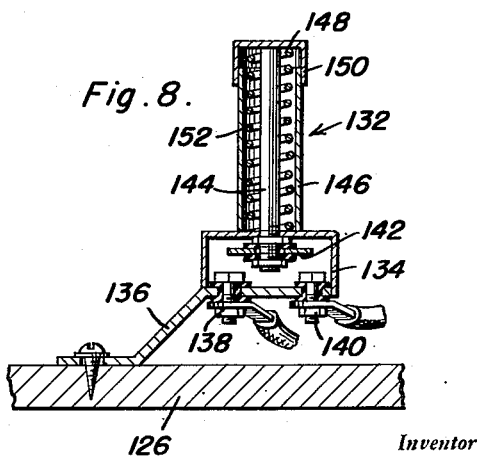
Inventor
Joe Cassady
By Clarence A. O'Brien
and Harvey B. Jacobson
Attorneys

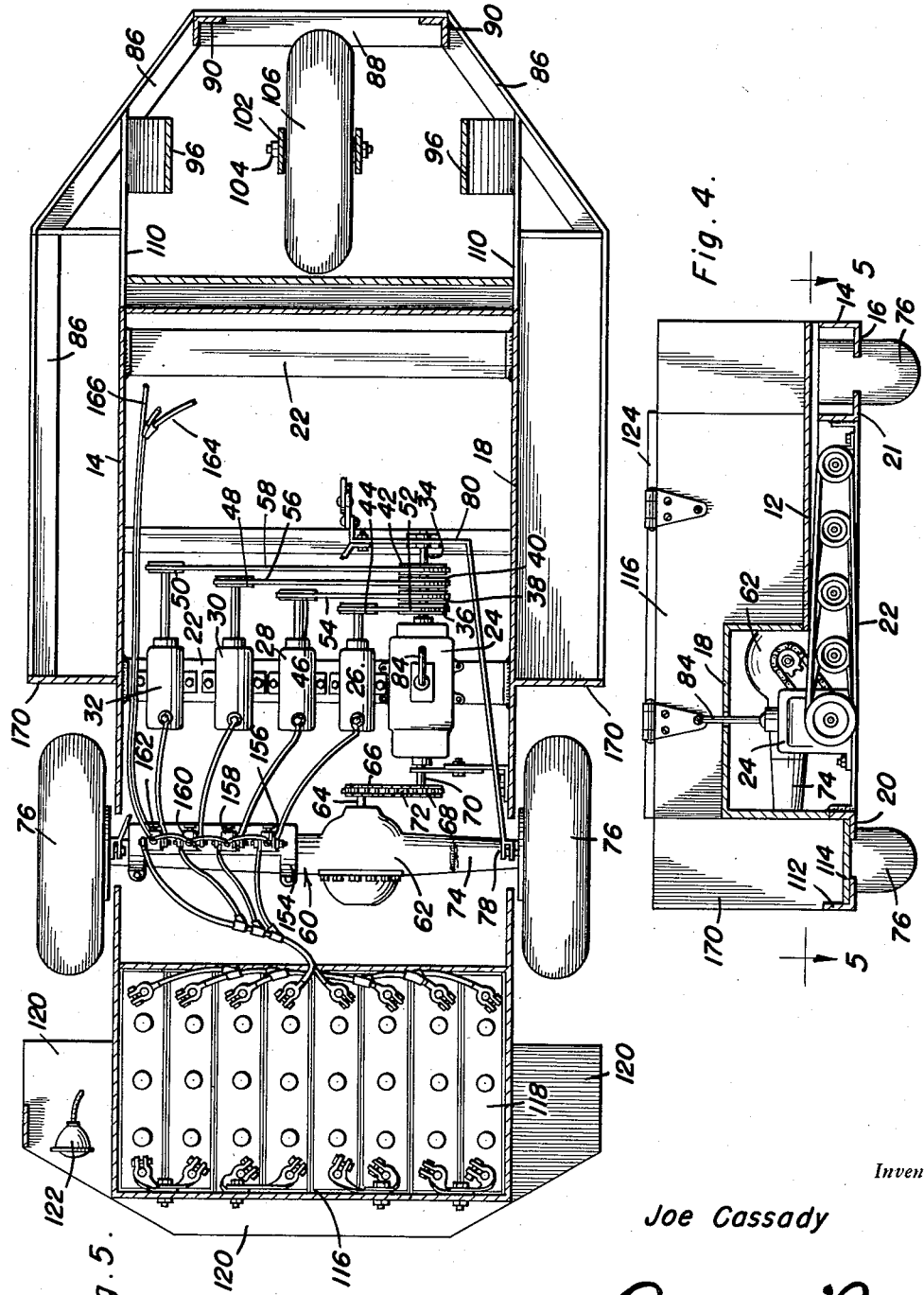

Oct. 9, 1951    J. CASSADY    2,570,319
LOW HEIGHT TRACTOR FOR HAULING MINE CARS
Filed Dec. 9, 1948    4 Sheets-Sheet 4

Inventor
Joe Cassady

Patented Oct. 9, 1951

2,570,319

UNITED STATES PATENT OFFICE 2,570,319

LOW-HEIGHT TRACTOR FOR HAULING MINE CARS

Joe Cassady, Iaeger, W. Va.

Application December 9, 1948, Serial No. 64,316

2 Claims. (Cl. 180—65)

This invention relates to new and useful improvements in tractors and the primary object of the present invention is to provide a three wheel, electrically operated, vehicle of a minimum overall height for hauling mine cars and the like.

Another important object of the present invention is to provide an electric motor driven vehicle for mines having a steering wheel permitting sharper turns to be effected than track-type or four wheel type vehicles presently employed as tractors in mines.

Another feature of the present invention is to provide a tractor for hauling mine cars having an operator's platform at one side and intermediate the forward and rear wheels thereof to reduce the shock normally affecting an operator.

Another feature of the present invention is to provide a tractor of the aforementioned character including an electrically operated motor for driving the tractor and embodying novel and improved battery compartments adapted to receive batteries for supplying energy to the motor and to lights mounted on the tractor.

Another feature of the present invention is to provide a tractor for hauling mine cars including a guard embracing the tractor and providing shielding means for the wheels of the tractor and an operator seated on the tractor.

A further object of the present invention is to provide a vehicle for hauling mine cars including an electrically operated power plant and a safety switch controlling the power plant, said switch being moved to a circuit open position when an operator releases the same to prevent accidental movement of the vehicle.

A still further aim of the present invention is to provide a tractor that is simple and practical in construction, strong and durable in use, small and compact in structure, efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a front elevational view of Figure 1;

Figure 4 is an enlarged transverse, vertical sectional view taken substantially on the plane of section line 4—4 of Figure 2;

Figure 5 is a longitudinal, horizontal sectional view taken substantially on the plane of section line 5—5 of Figure 4;

Figure 6 is an enlarged transverse vertical sectional view taken substantially on the plane of section line 6—6 of Figure 2;

Figure 7 is a fragmentary perspective view of the rear portion of the present invention and illustrating the hitch means;

Figure 8 is an enlarged, sectional view taken substantially on the plane of section line 8—8 of Figure 1 and illustrating the safety switch used in conjunction with the present invention;

Figure 1:
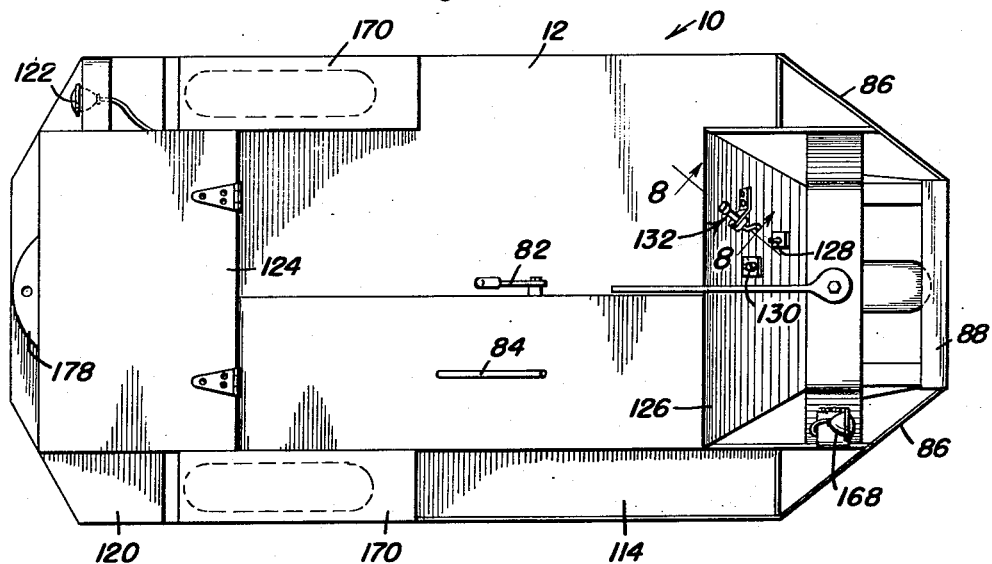
Figure 1 is a top plan view of the present invention.
Figure 2:
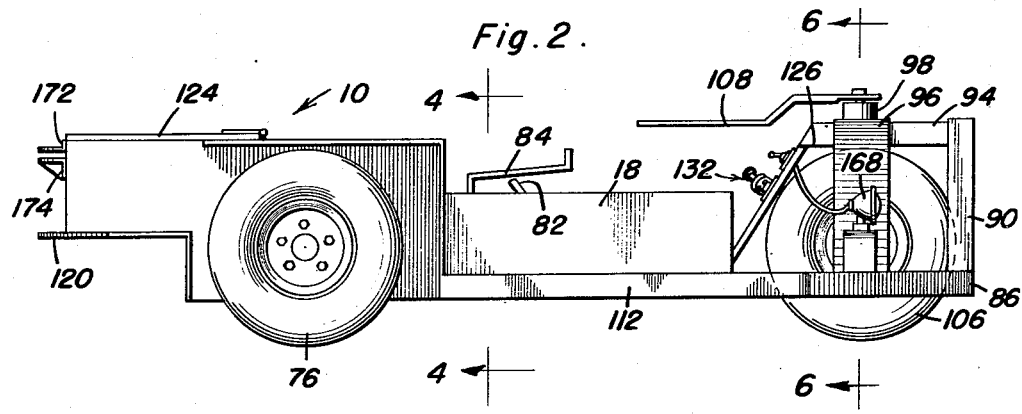
Figure 2 is a side elevational view of Figure 1.

Referring now to the drawings in detail, wherein for the purpose of illustration, there is disclosed a preferred embodiment of the present invention, the numeral 10 represents the present tractor or wheeled frame generally, including an elongated, substantially flat sheet of metal 12 forming a platform and having its outer longitudinal side edges turned downwardly to provide a relatively low side wall 14, and the lower portion of the side wall 14 is turned inwardly to form an outer flanged portion 16.

An enlarged channel member 18 is disposed adjacent the inner longitudinal edge of the sheet 12 and the inner leg of this member is secured by welding or the like to the inner longitudinal edge of the sheet 12, as shown best in Figure 4 of the drawings. To the outer leg of the channel member 18 there is suitably fixed a longitudinally extending angle iron beam 20 for a purpose which will later be more fully apparent.

The side wall 14 or an auxiliary side beam 21, braced to the side wall 14, is braced to the beam 20 by a plurality of transversely extending cross members or straps 22 one of which supports a transmission 24 and a plurality of electric motors 26, 28, 30 and 32. The transmission includes a driven shaft 34 that supports a plurality of pulleys 36, 38, 40 and 42 which are connected to pulleys 44, 46, 48 and 50, on the respective motors 26, 28, 30 and 32, by endless belts 52, 54, 56 and 58.

Extending transversely between and suitably secured to the side wall 14 and member 18, rearwardly of the transmission 24 and the motors 26, 28, 30 and 32, is a rear axle mounting 60 including a differential 62 having a forwardly projecting shaft 64 that supports a sprocket gear 66. The gear 66 is disposed adjacent a further sprocket gear 68 mounted on the rear portion 70 of the shaft 34 and is connected to the gear 66 by a sprocket chain 72.

One axle 74 of the mounting 60 is relatively short to position the differential and transmission at one side of the present tractor and beneath the web of the channel member 18 as illustrated best in Figure 4 of the drawings. The axle mounting 60 is associated with a pair of rear wheels 76 that are controlled by wheel brakes 78 of any suitable type and a brake operating rod 80 operatively connected to the brakes 78 are operated by a hand lever 82 disposed on the inner leg of the channel member 18 (see Fig. 1).

The gear shift lever or rod 84 for the transmission 24 extends forwardly through the web of the channel member 18 so that both the lever 82 and rod 84 may be conveniently operated by a driver seated upon the sheet of metal or platform 12.

Embracing the forward portion of the present tractor 10, is a guard consisting of a pair of forwardly and inwardly inclined angle iron members 86 the forward ends of which are joined by a cross beam 88. Posts 90 rise from the beam 88 and are connected to an upper cross beam 92 and a pair of rearwardly extending upper angle iron beams 94. A U-shaped support member 96 embraces and is suitably fixed to the beams 94. This support member 96 is provided with a central bearing 98 that receives an upstanding shaft 100 that projects from the web of a wheel fork 102 and the legs of the fork 102 support an axle 104 for a forward, steering wheel 106.

One end of a steering lever 108 is suitably secured to the shaft 100 and is normally disposed above the sheet of metal 12.

The legs of the U-shaped support member 96 are suitably fixed to extensions 110 projecting from the side wall 14 and member 18.

Spaced from the angle iron member 20 is a further angle iron guard and support rail 112 the forward end of which is fixed to one of the members 86. A support wall 114 is supported on the member 20 and rail 112 to form a battery compartment at one side of the instant tractor.

Extending between the side wall 14 and the member 18, there is provided a rear battery compartment 116 that is disposed rearwardly of the axle mounting 60 and which receives a plurality of batteries 118. Fins 120 project outwardly from the compartment 116 and form guards one of which supports a tail light 122. The compartment 116 includes a hinged closure 124 that is conveniently raised for access to the batteries 118.

An inclined foot board or floor panel 126 is fixed to the support 96, the member 18 and the sheet of metal 12 and supports a light switch 128, a master switch 130 and a safety switch 132. The switches 128 and 130 are of any suitable type, but the safety switch 132, as shown best in Figure 8, includes a casing 134 that is supported by a bracket 136. A pair of fixed contacts 138 and 140 carried by the casing 134 are adapted to be bridged by a movable contact plate 142 insulated from one end of and movable with a slidable plunger 144.

The plunger 144 is housed within a sleeve 146 and the upper end of the plunger 144 is fixed to a cap 148 having a flanged portion 150 that embraces the sleeve 146. A coil spring 152 embraces the plunger 144 and is biased between the casing 134 and the cap 148 to normally urge the plunger to a raised position with the contact plate 142 spaced from the contacts 138 and 140.

An anchor or base plate 154 is suitably secured to the axle mounting 60 and supports solenoids 156, 158, 160 and 162 that are connected by suitable conductors to the motors 26, 28, 30 and 32 respectively.

The batteries 118 are electrically connected in parallel and include four lead wires that are connected to the respective solenoids 156, 158, 160 and 162 so that all of the batteries will be discharged equally during the operation of the motors.

The switches 130 and 132 are connected to the solenoid 162 by wires 164 and 166 and the switch 128 is connected to the wires 164 in any suitable manner to control a forward lamp 168 carried by the support member 96.

In practical use of the present invention, the switches 130 or 132, are operated selectively, depending on whether the tractor is to be safely operated or not. When the switch 132 is used and the switch 130 is "off," as the operator releases the switch 132 the current to the motors will be "cut-off" to make the tractor inoperative.

As the switch, either 130 or 132, is moved to a circuit closing position, current will first enter the solenoid 162 to the motor 32 to start the shaft 34 rotating, then the solenoid 160 will be actuated to start the motor 30 and increase the rotation of the shaft 34, next the solenoid 158 will be actuated to start the motor 28 and further increase the speed of the shaft 34, and finally the solenoid 156 will be actuated to start the motor 26 and increase the rotary speed of the shaft 34 to its maximum. The above described operation for the motors is almost instantaneous and requires very little time.

It should be noted, that the primary feature of the present invention is to provide a small, compact and relatively low built tractor for use in pulling mine cars and consequently the overall height of the present tractor is approximately 24½".

Another feature of the present invention is to provide a tractor having a single steering wheel that is operated by a lever accessible from the platform 12.

Another feature of the instant mine car hauling tractor is the use of conventional and well known transmission and differential, such as a Plymouth, the latter being reconstructed to place the differential and transmission at one side of the tractor opposite from the driver's position to afford a proper and necessary balance.

Also the use of batteries will reduce the operating cost and make the present invention meet all requirements for use in mines.

The employment of the safety switch will permit deactivation of the motors when the driver is approaching an obstacle in order to reduce the traveling speed of the tractor which is relatively low.

Substantially L-shaped wheel shields or fenders 170 are suitably fixed to the sheet 12 and member 18 and embrace the wheels 76.

Means is provided for coupling the tractor 10 to a mine car and this means comprises upper and lower angle members 172 and 174 which are welded, or otherwise suitably fixed to the rear wall 176 of the compartment 116. The horizontal legs 178 and 180 of these angle members are spaced parallel to each other to receive a suitable draw bar and apertures 182 are provided in the legs 178 and 180 to receive a suitable hitch or coupling pin.

Figures 9, 10:
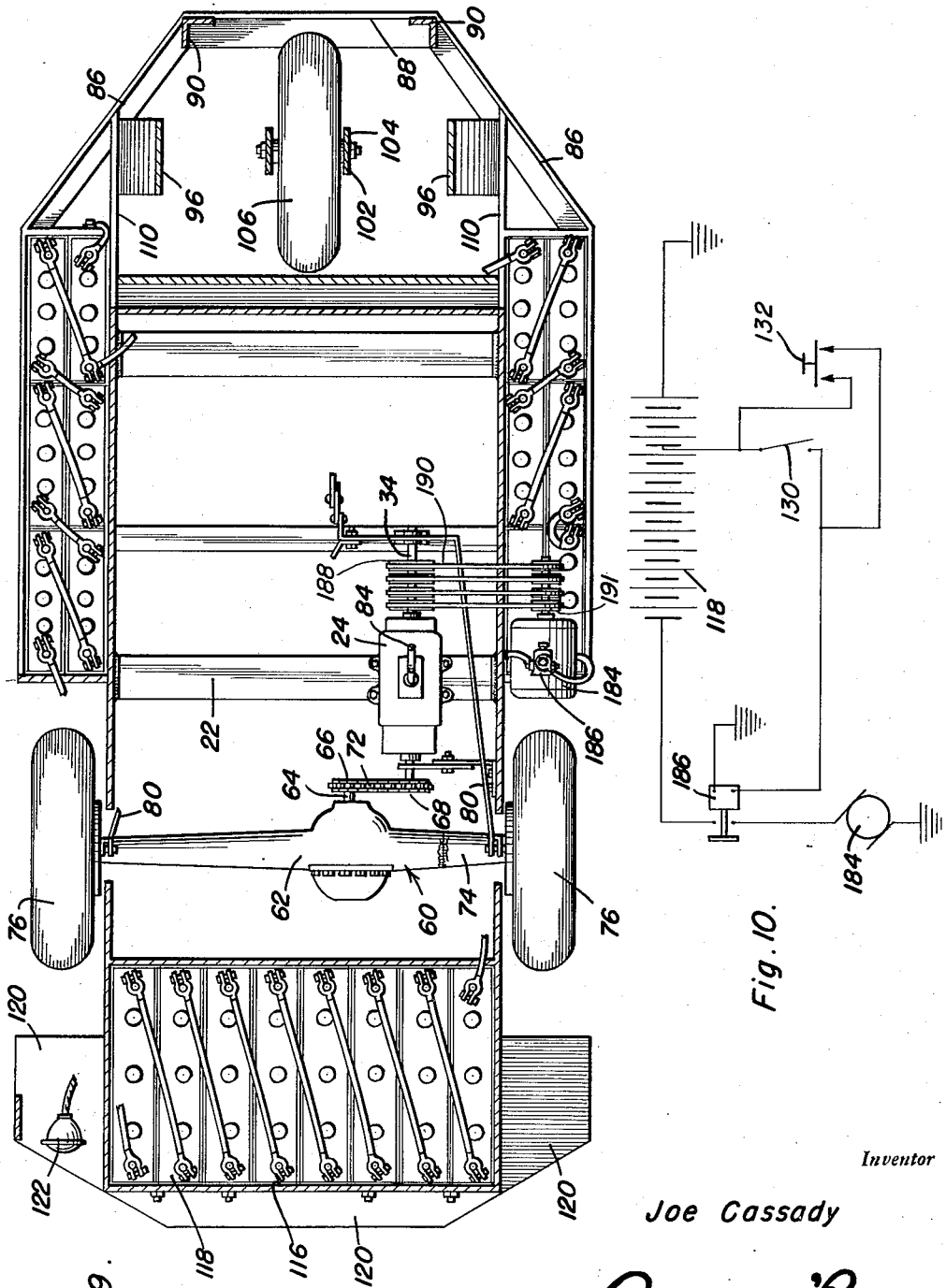
Figure 9 is a view similar to Figure 5 and showing the power means in slightly modified form.
Figure 10 is a schemmatic diagram showing the electrical circuit used in conjunction with the power means of Figure 9.

Obviously, many types of power plants could be utilized in conjunction with the present invention. One type is illustrated in Figures 1-8 inclusive, however, a further type is disclosed in Figures 9 and 10 wherein the group of motors is replaced by a single motor 184, and the group of solenoids is replaced by a single solenoid 186. The motor 184, is of the electric type, and inclures a drive shaft having a plurality of pulleys 188 thereon which are connected, by endless belts 190, to the pulleys 191 on the transmission 24.

Battery compartments are provided at the sides of the tractor in addition to the rear battery compartment 116 and the batteries in all compartments are connected in series to the solenoid 186 and motor 184, the motor requiring approximately 115 volts.

The switches 128, 130 and 132 are provided in this latest construction as well as the other parts previously referred to in the description for Figures 1-8 inclusive.

It is preferred that the instant tractor be constructed from metal, however, any suitable material, such as lumber, could be utilized without deviating from its intention.

Having described the invention, what is claimed as new is:

1. A tractor for hauling mine cars, said tractor comprising a three-wheeled frame of a height less than three feet, one of said wheels being a steering wheel and the other of said wheels being driving wheels, said frame including a hollow longitudinal portion at one side between said driving wheels and the steering wheel, said frame also including an elongated and flat platform at the side opposite said hollow portion and recessed relative to said hollow portion, said platform being sufficiently long to accommodate a driver in a prone position, an electrically operated power means mounted within said hollow portion and operatively connected to said driving wheels, and a rigid lever attached to said steering wheel for operating the steering wheel and disposed for movement in a plane below the top of the frame and above said hollow portion, whereby said lever is accessible by a driver disposed on said platform in a prone position.

2. A tractor for hauling mine cars, said tractor being of minimum height and comprising an elongated frame having a front steering wheel and a pair of rear driving wheels, said frame including a hollow longitudinal portion at one side extending between said steering wheel and said driving wheels, said frame also including a longitudinal platform disposed below the hollow portion and alongside of said hollow portion between the steering wheel and the driving wheels and being sufficiently long to accommodate an operator in a prone position, and a steering lever attached to said steering wheel and disposed for movement in a plane below the top of the frame and above the hollow portion to permit manual operation of said steering wheel by a driver disposed in a prone position on said platform, and an electrically operated power means mounted within said hollow portion and operatively connected to said driving wheels.

JOE CASSADY.

REFERENCES CITED

The following references are of record in the file of this patent:

UNITED STATES PATENTS

| Number | Name | Date |
|---|---|---|
| 704,809 | Krotz | July 15, 1902 |
| 1,164,863 | Potter et al. | Dec. 21, 1915 |
| 1,233,824 | Towson | July 17, 1917 |
| 1,635,236 | Tolson | July 12, 1927 |
| 1,759,252 | Coburn et al. | May 20, 1930 |
| 1,892,865 | Brown | Jan. 3, 1933 |
| 1,974,922 | La Croix | Sept. 25, 1934 |
| 2,184,557 | Lloyd | Dec. 26, 1939 |
| 2,209,177 | Stoltz | July 23, 1940 |
| 2,232,275 | Ronning | Feb. 18, 1941 |
| 2,284,661 | Joy | June 2, 1942 |
| 2,395,323 | Framhein | Feb. 19, 1946 |
| 2,477,252 | Hutchings | July 26, 1949 |